Patented July 2, 1935

2,006,546

UNITED STATES PATENT OFFICE 2,006,546

DYEING OR OTHERWISE COLORING OF MATERIALS MADE OF OR CONTAINING CELLULOSE ESTERS AND ETHERS

George Holland Ellis and Henry Charles Olpin, Spondon, near Derby, England, assignors to Celanese Corporation of America, a corporation of Delaware No Drawing. Original application June 22, 1928, Serial No. 287,646. Divided and this application February 25, 1932, Serial No. 595,225. In Great Britain July 20, 1927

5 Claims. (Cl. 8—5)

This application is a divisional application from application S. No. 287,646 filed 22nd June, 1928. The invention relates to the dyeing, printing, stencilling or otherwise coloring of yarns, threads knitted or woven fabrics or other products made with or containing cellulose acetate or other organic acid esters of cellulose, such for example as cellulose formate, propionate or butyrate or the products obtained by the treatment of alkalized cellulose with sulpho-chlorides (e. g. the product obtained with p-toluene sulpho-chloride and known as "immunized cotton"), or made of or containing cellulose ethers, such as methyl cellulose, ethyl cellulose, or benzyl cellulose, or the corresponding condensation products of cellulose and glycols or other polyhydric alcohols, all of which cellulose derivatives are hereinafter referred to as organic substitution derivatives of cellulose.

It is well known that azoic colorations may be produced upon cotton and like materials by applying an alkaline solution of an acetoacetyl developer, for example diacetoacetyl-ortho-tolidide which has the probable structural formula

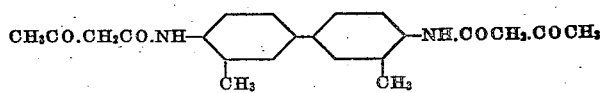

and coupling with a suitable diazo solution. This method is not applicable with success to the coloration of the type of material specified above, namely the organic substitution derivatives of cellulose, owing to the lack of substantive affinity for the fibre of the alkali derivative of the arylide. We have found that if the developer be applied after the material contains the diazo compound then satisfactory and valuable colorations are obtained. Broadly the developers of the present invention may contain one or more acetoacetyl or other ketoacidyl groups.

The components whether diazo component or coupling component may contain any other substituent groups, such as amino, substituted amino, hydroxy, alkoxy, halogen, carboxylic, or mercapto groups or the like and may be soluble or insoluble in water.

The components which are insoluble or insufficiently soluble in water may be applied in dispersion, and for this purpose may be dispersed in water, for example by dissolving in a solvent and mixing the solution with water containing if desirable protective colloids or dispersing agents, by grinding, or by pretreating the components with dispersing agents, e. g. those referred to in U. S. Patents Nos. 1,618,413, 1,618,414, 1,690,481, 1,694,413 and 1,716,721. Alternatively they may be dissolved in any suitable solvents and applied by dry dyeing methods.

The solutions, suspensions or dispersions may be applied to the materials by any methods known in the dyeing arts or they, and particularly the solutions in organic solvents, may be applied by spraying as described in U. S. application S. No. 273,436 filed 27th April, 1928. For printing or stencilling they may be thickened with flour, starch, gum, dextrin or other thickeners.

For the production of compound shades the coloring matters of the present invention may be mixed with any other dyestuffs (diazotizable or otherwise) or components suitable for dyeing the cellulose derivative, for example basic dyestuffs, indigoid dyestuffs or esters of leuco indigoid dyestuffs or the insoluble colors now generally applied to cellulose acetate, for example coloring matters of any of the classes enumerated in prior U. S. Patents Nos. 1,618,413, 1,600,277, 1,618,415, 1,694,414 and 1,679,935.

The processes of the present invention may be applied to the dyeing or otherwise coloring of mixed materials comprising, in addition to cellulose acetate or other organic substitution derivatives of cellulose, silk, wool, or cotton or other cellulosic fibres, natural or artificial. The said other components may be dyed before, after or together with the cellulose ester or ether portions, for example with dyestuffs having no affinity for the ester or ether. For instance cotton, silk or wool may be dyed with direct cotton colors, or acid colors or anthraquinone vat colors, the cellulose acetate or other ester or ether being dyed with the ketoacidyl colors of the present invention.

The following example illustrates the invention but is not to be regarded as limiting it in any way:—

Example

To dye 100 lbs. of cellulose acetate yarn in hank form a golden brown:—

1 lb. of p-nitrobenzene-azo-p-xylidine is ground to a fine powder and sieved into 5 lbs. of Turkey red oil (50%). The whole is heated, with stirring, to 90–95° C., and, when as homogeneous as possible, slowly diluted while stirring with 10 gallons of hot soft water. The dispersion is then added through a filter cloth into a 300 gallon bath set with ½ gram of olive oil soap per litre.

The goods are now entered, worked for ¾ hour from the cold to 80° C., and for a further ¾ hour at 80° C. They are lifted, rinsed and diazotized in a 150 gallon bath containing 4 lbs. of sodium nitrite and 20 lbs. of hydrochloric acid 30° Tw. The goods are worked for 30 minutes in this solution in the cold, lifted and well rinsed. For developing the goods are entered into 300 gallon bath containing 3 lbs. diacetoacetyl-ortho-tolidide dissolved in 1½ lbs. caustic soda, and 3 lbs. Turkey red oil 50%. The shade is fully developed after 1 hour's treatment cold to 40° C., and the goods are then lifted, rinsed and dried or otherwise treated as requisite.

Instead of the cellulose acetate materials treated in the above example, materials made with or containing other organic substitution derivatives of cellulose, for example cellulose formate, cellulose propionate, methyl cellulose, ethyl cellulose or "immunized cotton" may be similarly colored.

What we claim and desire to secure by Letters Patent is:—

1. In the coloration of materials comprising organic substitution derivatives of cellulose by azoic methods, applying an acetoacetyl coupling component to the material already containing a diazo compound.

2. In the coloration of materials comprising cellulose acetate by azoic methods, applying an acetoacetyl coupling component to the material already containing a diazo compound.

3. In the coloration of materials comprising cellulose acetate by azoic methods, applying an acetoacetyl arylide to the material already containing a diazo compound.

4. In the coloration of materials comprising cellulose acetate by the azoic process, applying an amino compound, diazotizing and coupling by applying a dispersion of an acetoacetyl arylide.

5. In the coloration of materials comprising cellulose acetate by the azoic process, applying an amino compound, diazotizing and coupling by applying an alkaline solution of an acetoacetyl arylide.

GEORGE HOLLAND ELLIS.
HENRY CHARLES OLPIN.